United States Patent
Takeda

(10) Patent No.: US 7,384,159 B2
(45) Date of Patent: Jun. 10, 2008

(54) LIGHT SOURCE UNIT AND IMAGE DISPLAY UNIT

(75) Inventor: Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 237 days.

(21) Appl. No.: 11/289,492

(22) Filed: Nov. 30, 2005

(65) Prior Publication Data

US 2006/0120075 A1    Jun. 8, 2006

(30) Foreign Application Priority Data

Dec. 3, 2004    (JP)    ............................. 2004-350820

(51) Int. Cl.
*F21V 5/00*    (2006.01)
(52) U.S. Cl. ........................................ 353/94; 362/235
(58) Field of Classification Search ................... 353/38, 353/98, 99, 81, 94; 362/613, 227, 235, 800
See application file for complete search history.

(56) References Cited

U.S. PATENT DOCUMENTS 5,510,861 A *    4/1996 Minich et al. .............. 353/119
5,673,986 A    10/1997 Koo
5,887,096 A    3/1999 Du et al.
6,240,116 B1*    5/2001 Lang et al. ............... 372/50.12
6,961,176 B2    11/2005 Sekiguchi
2006/0170872 A1*    8/2006 Zhang ......................... 353/31

FOREIGN PATENT DOCUMENTS

| CN | 1544971 | 11/2004 |
|---|---|---|
| JP | A 2001-194606 | 7/2001 |
| JP | A-2002-287060 | 10/2002 |
| JP | 2003-021800 | 1/2003 |
| KR | 0152858 | 6/1998 |
| KR | 10-2004-0038845 A | 5/2004 |

OTHER PUBLICATIONS

Study of External Cavity Semiconductor Laser; A CTA Scientiarum Naturalium Universitatis Nankaicnsis; Dec. 2002, vol. 35, No. 4; pp. 1-4.

* cited by examiner

*Primary Examiner*—William C. Dowling
(74) *Attorney, Agent, or Firm*—Oliff & Berridge, PLC

(57) ABSTRACT

A light source unit includes: a plurality of light sources that provide light beams; and an optical-path changing section that outputs the light beams emitted from the light sources such that the light beams are substantially parallel to one another and the distance therebetween are smaller than the distance at entering from the light sources, thereby changing the optical path of the light beams.

5 Claims, 5 Drawing Sheets

F I G. 2
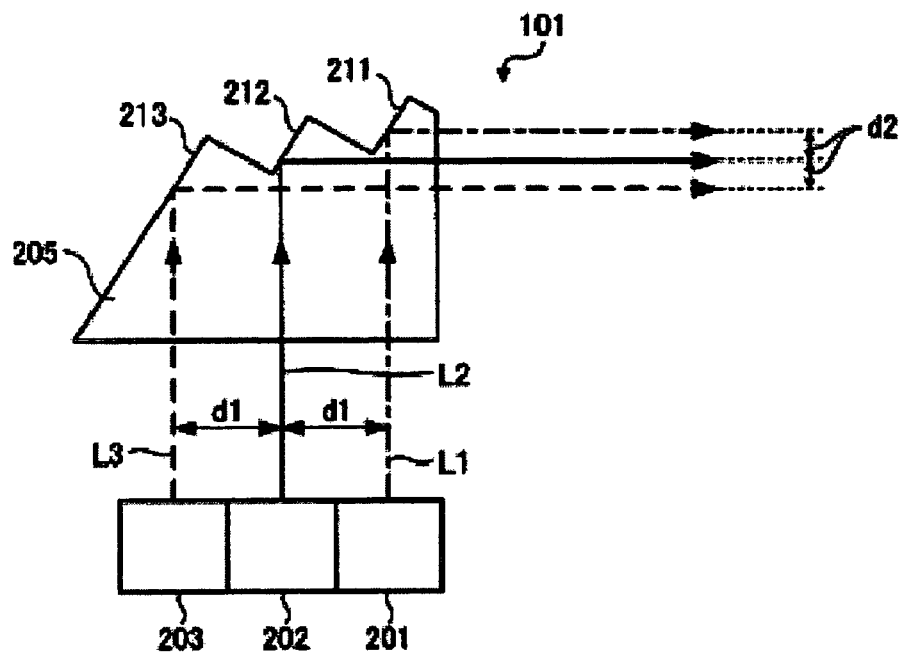
F I G. 3
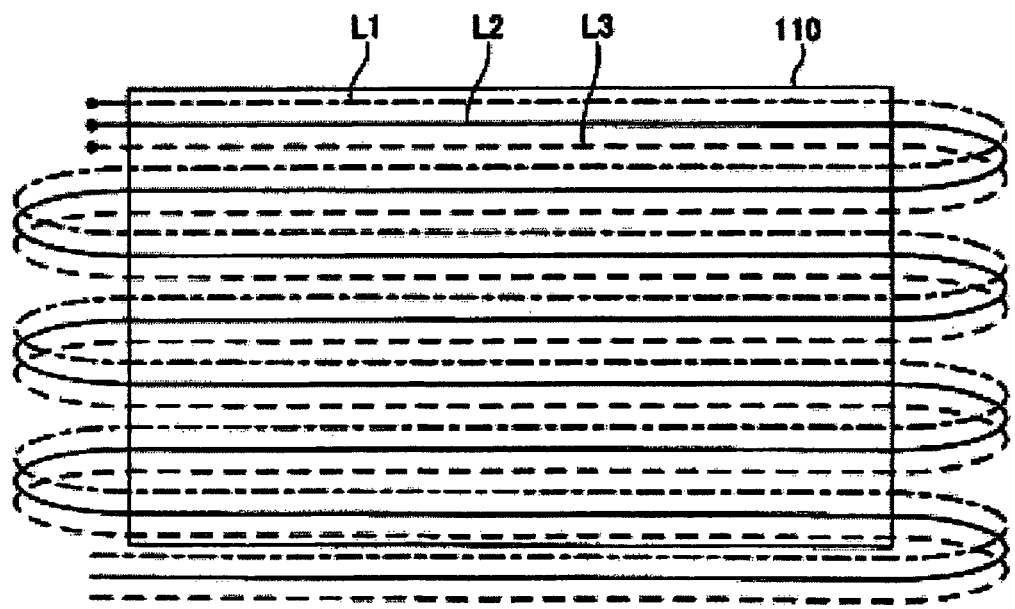

F I G. 8
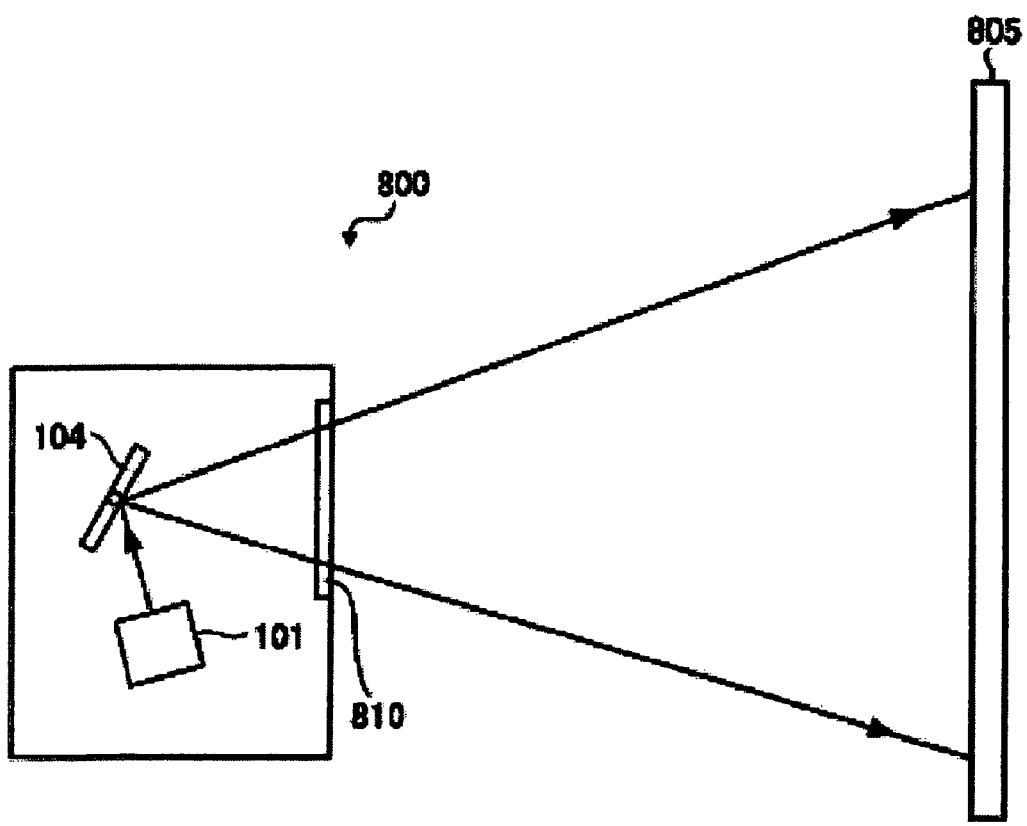

LIGHT SOURCE UNIT AND IMAGE DISPLAY UNIT

The present application claims priority to Japanese Patent Application No. 2004-350820 filed Dec. 3, 2004, which is hereby expressly incorporated by reference herein in its entirety.

BACKGROUND

1. Technical Field

The present invention relates to a light source unit and an image display unit, and in particular, to a light source unit for displaying an image by using laser light modulated in response to an image signal, and a technique of an image display unit that uses the light source unit.

2. Related Art

Image display units that display images using laser light have been proposed in recent years. The image display units that use laser light include front projectors and rear projectors. Laser light is suitable for bright images with high color-reproducibility owing to its high monochromaticity and directivity. For displaying of color images with laser light, for example, a red laser light (hereinafter, referred to as an R-light), a green laser light (hereinafter, referred to as a G-light), and a blue laser light (hereinafter, referred to as a B-light) are applied. A scanning optical system can be simplified by application of the color lights with the same mirror rather than with respective mirrors for the color lights. When mirrors are provided for individual color lights, the mirrors must be driven in synchronism. Accordingly, the use of the same mirror for all the color lights can simplify the control of the mirror. An example of the technique of applying a plurality of laser lights is disclosed in JP-A-2003-21800.

When positions to be scanned with color laser lights are apart from one another on the region to be scanned with laser light, the spaces among the color lights may be recognized as the seam of images. This may also make it difficult to apply the laser lights to an exact position according to an image signal. Accordingly, it is considered desirable that laser light be close to one another on the region to be scanned with laser light to have substantially the same space as the pitch of pixels, for example. However, this produces the problem of difficulty in providing the laser lights at substantially the same spaces as the pitch of pixels.

SUMMARY

An advantage of some aspects of the invention is to provide a light source unit capable of applying a plurality of light beams in proximity and an image display unit that uses the light source unit.

According to a first aspect of the invention, a light source unit can be provided which includes a plurality of light sources that provides light beams; and an optical-path changing section that outputs the light beams emitted from the light sources such that the light beams are substantially parallel to one another and the distance therebetween are smaller than the distance at entering from the light sources, thereby changing the optical path of the light beams.

Since the optical-path changing section that substantially collimates the light beams and reduces the distance among the light beams as compared with the distance of the light beams incident from the light sources is provided, the positions of incidence of the light beams in the region being irradiated can be brought close to one another. The use of the optical-path changing section allows the light beams to be brought close to one another, for example, to substantially the same space as the pitch of pixels regardless of the size of the light sources. This achieves a light source unit capable of applying a plurality of light beams in proximity.

Preferably, the plurality of light sources provide the substantially parallel light beams to the optical-path changing section; the optical-path changing section has a reflecting plane having steps corresponding to the light sources; and the reflecting plane reflects the light beams from the corresponding light sources. The use of the stepped reflecting plane corresponding to the light sources allows the substantially parallel incident light beams to be output such that the light beams are substantially parallel to one another and the distance among the light beams is smaller than that at entering from the light sources. Thus the plurality of light beams can be applied in proximity.

Preferably, the optical-path changing section is a prism element that transmits the light beams; and the reflecting plane is the interface of the prism element that completely reflects the light beams traveling in the prism element. Thus the plurality of light beams can be applied in proximity.

Preferably, the optical-path changing section includes a plurality of mirrors that reflect the light beams. Thus a plurality of light beams can be applied in proximity. The optical-path changing section can easily be constructed such that a plurality of mirrors are placed one on another to have steps corresponding to the light sources.

Preferably, the plurality of light sources provide the substantially parallel light beams to the optical-path changing section. It is preferable that the optical-path changing section includes a convergent lens that converges the light beams from the plurality of light sources; and a divergent lens that diverges the light beams from the convergent lens. The convergent lens converges the light beams from the light sources. The divergent lens diverges the light beams converged by the convergent lens, thereby substantially collimating them. The distance among the light beams incident in substantially parallel can be made substantially parallel and smaller than that incident from the light sources. Thus a plurality of light beams can be applied in proximity.

Preferably, the plurality of light sources provide the substantially parallel light beams to the optical-path changing section; and the optical-path changing section is a prism element that transmits the light beams. It is preferable that the prism element have a refractive plane that refracts the light beams so as to decrease the distance among the light beams. The light beams incident on the prism element are refracted by the refracting plane such that the distance among them is decreased. Thus a plurality of light beams can be applied in proximity.

Preferably, the light source unit further includes a detecting section that detects the light beams. It is preferable that the reflecting plane reflects part of the light beams incident from the light sources and transmits part of the other of the light beams incident from the light sources; the detecting section detects the light beams that has passed through the reflecting plane; and the light sources control the amount of the light beams to be emitted according to the detection result of the detecting section. The light beams reflected by the reflecting plane are applied such that they are substantially in parallel and at a distance smaller than that incident from the light sources. The light beams that have passed through the reflecting plane travel in a different direction from the direction of lighting into a detecting section. The light source unit can feedback-control the light sources by using the light beams that have passed through the reflecting plane. This allows a plurality of light beams to be brought close to one another at a preferable balance of light amount.

According to a second aspect of the invention, an image display unit is provided which includes: a light source unit that provides light beams responsive to an image signal; and a scanning section that applies the light beams from the light source unit. The light source unit is the above-described light source unit. The use of the light source unit allows a plurality of light beams to be applied in proximity. Thus an image display unit capable of displaying high-quality images can be provided.

BRIEF DESCRIPTION OF THE DRAWINGS

The invention will be described with reference to the accompanying drawings, wherein like numbers reference like elements.

FIG. 2 is a schematic diagram of a light source unit.

FIG. 3 is an explanatory diagram of the scanning of R-light, G-light, and B-light on a screen.

FIG. 8 is a schematic diagram of a light source unit according to a fifth embodiment of the invention.

DESCRIPTION OF EXEMPLARY EMBODIMENTS

First Embodiment

Figure 1:
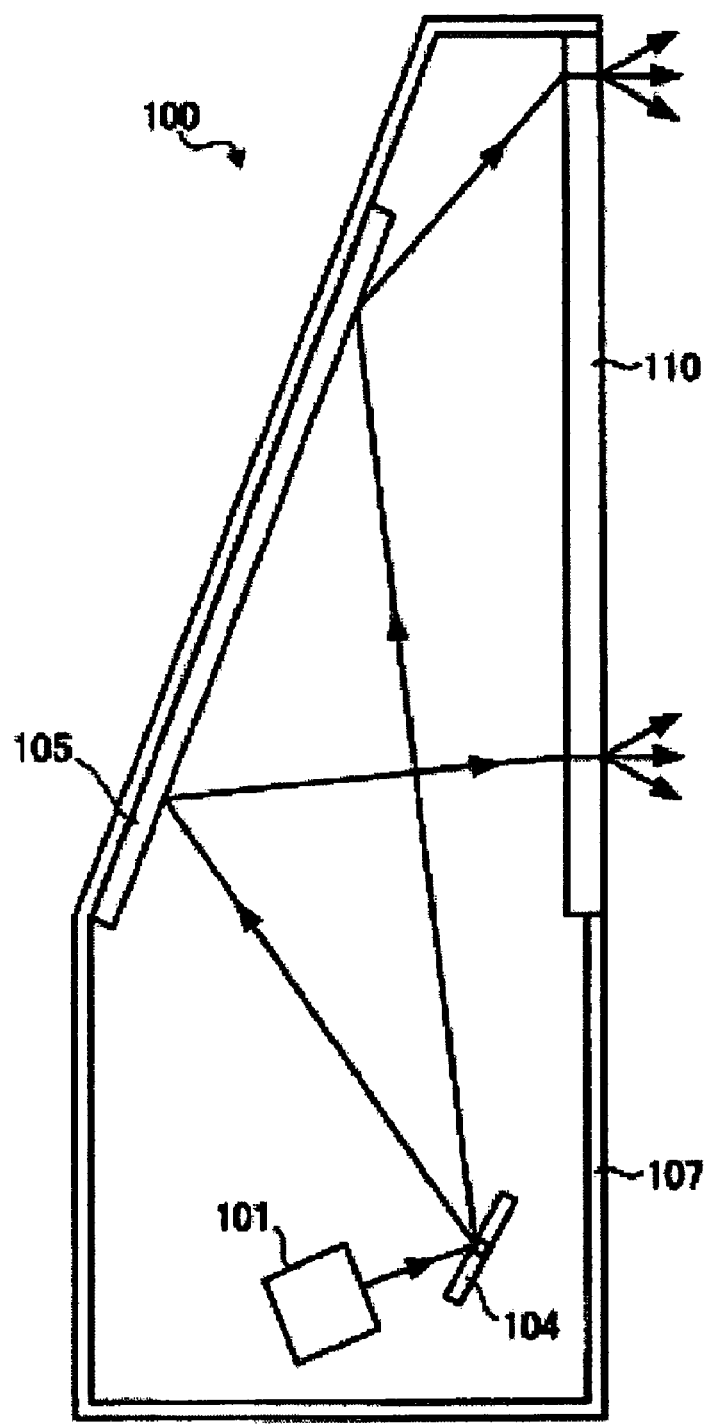
FIG. 1 is a schematic diagram of an image display unit according to a first embodiment of the invention.

FIG. 1 is a schematic diagram of an image display unit 100 according to a first embodiment of the invention. The image display unit 100 is a so-called rear projector for displaying images in such a way that laser beam light that is applied onto one surface of a screen 110 and is output from the other surface of the screen 110 is displayed. A light source unit 101 applies laser light responsive to an image signal toward a galvano mirror 104. The galvano mirror 104 reflects the laser light from the light source unit 101 toward a reflecting mirror 105.

The galvano mirror 104 is a scanning section for applying the light from the light source unit 101. The galvano mirror 104 applies laser light in a two-dimensional direction by rotating around specified two shafts interesting at right angles. The galvano mirror 104 can be manufactured by, for example, micro electro mechanical system (MEMS) technology. The reflecting mirror 105 is provided on the inner surface of a casing 107 and in a position facing the screen 110. The laser light incident on the reflecting mirror 105 travels toward the screen 110.

The casing 107 seals the space in the casing 107. The screen 110 is disposed on a surface of the casing 107. The screen 110 is a transmissive screen that allows laser light modulated in response to an image signal to pass through. The light from the reflecting mirror 105 enters from the surface of the screen 110 adjacent to the inner surface of the casing 107 and then outgoes from the surface adjacent to a viewer. The viewer can view images by viewing the light outgoing from the screen 110.

FIG. 2 shows the structure of the light source unit 101. The light source unit 101 includes three light sources 201, 202, and 203, and a prism element 205. The light source 201 applies R-light L1 modulated in response to an image signal. The light source 202 applies G-light L2 modulated in response to an image signal. The light source 203 applies G-light L3 modulated in response to an image signal. The light sources 201, 202, and 203 can be a semiconductor laser having a modulator for modulating laser light, or a solid-state laser. The modulation responsive to an image signal may be either of amplitude modulation and pulse-width modulation.

The light sources 201, 202, and 203 can apply high-directivity laser light. The light sources 201, 202, and 203 are disposed so that the R-light L1, the G-light L2, and the B-light L3 are substantially parallel with one another. The light sources 201, 202, and 203 are also disposed so that the distance between the R-light L1 and the G-light L2 and the distance between the G-light L2 and the B-light L3 are a substantially equal length d1. The output of the light sources 201, 202, and 203 may have a shaping optical system for shaping the laser light into a beam having a diameter of 0.5 mm. The output of the light sources 201, 202, and 203 may have an optical element for substantially collimating the R-light L1, the G-light L2, and the B-light L3.

The light sources 201, 202, and 203 apply substantially parallel beam lights to the prism element 205. The prism element 205 serves as an optical-path changing section that transmits the R-light L1, the G-light L2, and the B-light L3 to change the optical path thereof. The prism element 205 is made of a glass material or a transparent resin material. The incidence plane of the prism element 205 is arranged to be substantially perpendicular to the R-light L1, the G-light L2, and the B-light L3. On the interface of the prism element 205 opposite to the incidence plane, step-like slopes 211, 212, and 213 are provided. The prism element 205 can be formed by cutting or injection molding.

The slope 211 is provided in the position on which the R-light L1 is incident. The slope 212 is provided in the position on which the G-light L2 is incident. The slope 213 is provided in the position on which the B-light L3 is incident. The slopes 211, 212, and 213 are inclined at substantially the same angle. Thus the slopes 211, 212, and 213 form steps corresponding to the light sources 201, 202, and 203.

The R-light L1 traveling in the prism element 205 toward the slope 211 is completely reflected by the slope 211, thereby changing in the direction of traveling. The slope 211 serves as a reflecting plane for reflecting the R-light L1 from the corresponding light source 201. Also the G-light L2 and the B-light L3 are completely reflected by the slopes 212 and 213, respectively, to change in the direction of traveling, as is the R-light L1. The slopes 212 and 213 serve as reflecting planes for reflecting the G-light L2 and the B-light L3 from the corresponding light sources 202 and 203, respectively.

Since the slopes 211, 212, and 213 have substantially the same inclination, the R-light L1, the G-light L2, and the B-light L3 whose direction of traveling has been changed by the slopes 211, 212, and 213 are substantially parallel with one another. The slopes 211, 212, and 213 are disposed so that the distance among the R-light L1, the G-light L2, and the B-light L3 is changed to a length d2 shorter than the length d1. Accordingly, the prism element 205 outputs the R-light L1, the G-light L2, and the B-light L3 incident from the light sources 201, 202, and 203 such that they are substantially parallel with one another and the distance between them are smaller than that entering from the light sources 201, 202, and 203.

FIG. 3 is an explanatory diagram of the scanning of the R-light L1, the G-light L2, and the B-light L3 on the screen 110. The R-light L1, the G-light L2, and the B-light L3 from the light source unit 101 are incident on the screen 110 substantially in parallel with one another. The R-light L1, the G-light L2, and the B-light L3 enter the screen 110 in parallel vertically. The distance between the incidence position of the R-light L1 and the incidence position of the G-light L2, and the distance between the incidence position of the G-light L2 and the incidence position of the B-light L3 are substantially equal to, for example, the pitch of the pixels on the screen 110. The R-light L1, the G-light L2, and the B-light L3 may be arranged in parallel diagonally on the screen 110, in place of being arranged in parallel vertically.

The R-light L1, the G-light L2, and the B-light L3 first scan the uppermost of the screen 110 horizontally. Upon completion of the scanning of the uppermost of the screen 110, the R-light L1, the G-light L2, and the B-light L3 move the scanning position to a position one step lower than that. The R-light L1, the G-light L2, and the B-light L3 scan horizontally in the opposite direction. The color lights scan the entire screen 110 by repeating such operation. The color lights scan horizontally a plurality of times during one-time vertical scanning. The color lights may be parallel horizontally on the screen 110. For horizontal parallel arrangement of the color lights, the color lights scan vertically by a plurality of times during one-time horizontal scanning.

The prism element 205, which substantially collimates the color lights and reduces the distance among them than that incident from the light sources 201, 202, and 203, can bring the positions of incidence of the color lights close to one another on the screen 110 to be irradiated. Particularly, even with large-sized light sources 201, 202, and 203, the color lights can be brought close to one another. This offers the advantage that a plurality of beam lights can be applied in proximity to one another. Since color lights are applied in proximity, an image whose seam is hardly recognized can be displayed, and the color lights can be applied to an accurate position in response to an image signal. Thus a high-quality image can be displayed.

Figure 4:
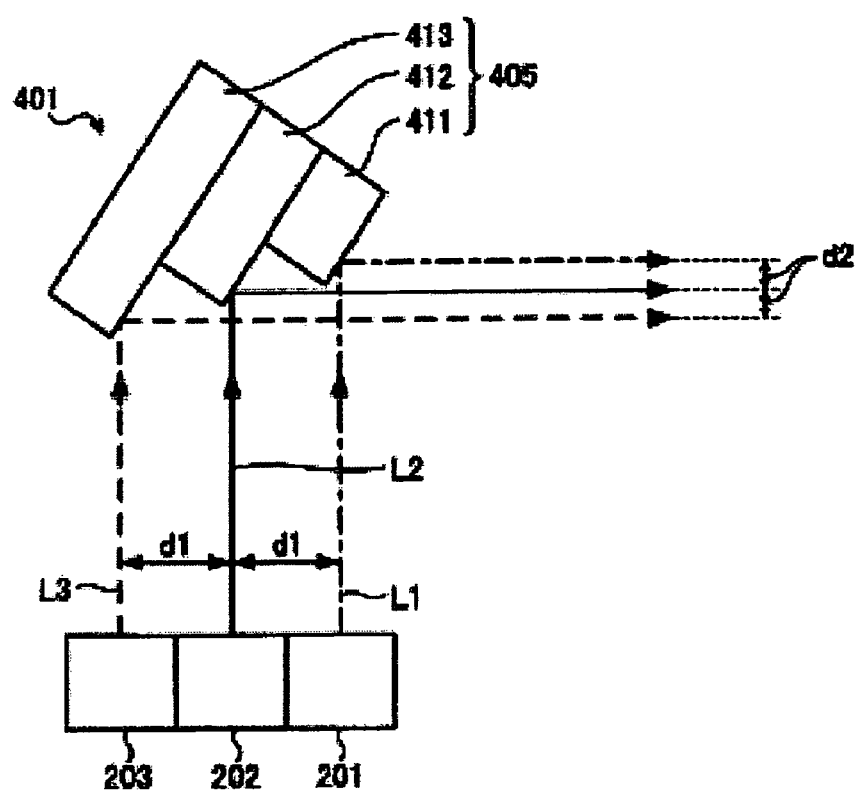
FIG. 4 is a schematic diagram of a light source unit according to a modification of the first embodiment.

FIG. 4 is a schematic diagram of a light source unit 401 according to a modification of the first embodiment. The light source unit 401 includes an optical-path changing section 405 composed of three mirrors 411, 412, and 413. The optical-path changing section 405 is constructed such that the mirrors 413, 412, and 411 are placed one on another in this order. The mirrors 411, 412, and 413 are made of high-reflectivity metal. Alternatively, the mirrors 411, 412, and 413 may be constructed such that a plate-like member is coated with a metal film or a dielectric multilayer.

The mirror 413 has an area larger than that of the other mirrors 412 and 411. Onto the part of the mirror 413 on which the mirror 412 is not placed, the B-light L3 from the light source 203 is incident. The mirror 412 has an area larger than that of the mirror 411. Onto the part of the mirror 412 on which the mirror 411 is not placed, the G-light L2 from the light source 202 is incident. Onto the mirror 411, the R-light L1 from the light source 201 is incident. The mirrors 411, 412, and 413 are inclined at substantially the same angle. The mirrors 411, 412, and 413 have steps corresponding to the light sources 201, 202, and 203.

The R-light L1 incident on the mirror 411 is reflected by the mirror 411, thereby changing in the direction of traveling. The mirror 411 serves as a reflecting plane for reflecting the R-light L1 from the corresponding light source 201. Also the G-light L2 and the B-light L3 are reflected by the mirrors 412 and 413, respectively, to change in the direction of traveling as is the R-light L1. The mirrors 412 and 413 serve as reflecting planes for reflecting the G-light L2 and the B-light L3 from the corresponding light sources 202 and 203, respectively.

Since the mirrors 411, 412, and 413 have substantially the same inclination, the R-light L1, the G-light L2, and the B-light L3 whose direction of traveling has been changed by the mirrors 411, 412, and 413 are substantially parallel with one another. The mirrors 411, 412, and 413 are disposed so that the distance among the R-light L1, the G-light L2, and the B-light L3 is changed to a length d2 shorter than the length d1. Accordingly, the optical-path changing section 405 outputs the R-light L1, the G-light L2, and the B-light L3 incident from the light sources 201, 202, and 203 such that they are substantially parallel and the distance between them are smaller than that when they enter from the light sources 201, 202, and 203, respectively.

Thus a plurality of beam lights can be applied in proximity to one another. The optical-path changing section 405 can easily be constructed such that the mirrors 411, 412, and 413 are placed one on another to form steps corresponding to the light sources 201, 202, and 203. The optical-path changing section 405 may not be limited to the structure in which the three mirrors 411, 412, and 413 are placed one on another to form steps but may be one mirror having steps. The prism element 205 may have a reflective member on the slopes 211, 212, and 213, thereby changing the optical path of the color lights by reflection.

Second Embodiment

Figure 5:
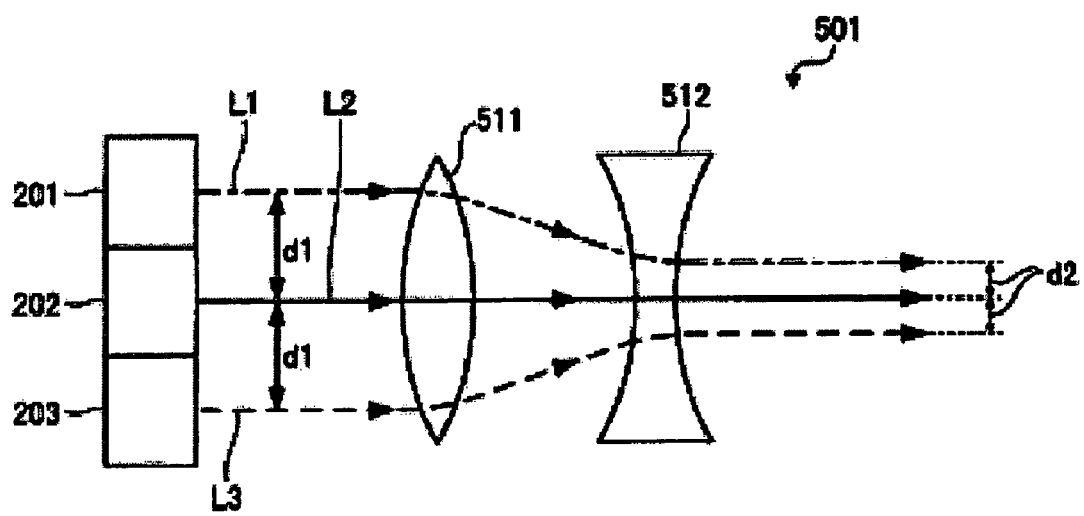
FIG. 5 is a schematic diagram of a light source unit according to a second embodiment of the invention.

FIG. 5 is a schematic diagram of a light source unit 501 according to a second embodiment of the invention. The same components as those of the light source unit 101 according to the first embodiment are given the same reference numerals and their duplicate description will be omitted. The light source unit 501 includes a convergent lens 511 and a divergent lens 512. The convergent lens 511 and the divergent lens 512 serve as optical-path changing sections for changing the optical paths of the color lights. Substantially parallel color lights are incident on the convergent lens 511. The convergent lens 511 is a convex lens that converges the color lights from the light sources 201, 202, and 203.

The lights from the convergent lens 511 are incident on the divergent lens 512. The divergent lens 512 is a concave lens that diverges the lights from the convergent lens 511 into substantially parallel lights. Thus the color lights from the light sources 201, 202, and 203 are output such that they are substantially parallel and the distance between them are smaller than that when they enter from the light sources 201, 202, and 203. Accordingly, the color lights can be applied in proximity.

The convergent lens 511 and the divergent lens 512 may not be limited to the structure in which the light-incident plane and the light-exiting plane are spherical or aspherical curved surfaces, but one of the light-incident plane and the light-exiting plane may be a curved surface. Alternatively, the convergent lens 511 and the divergent lens 512 may not be limited to the structure having a spherical or aspherical curved surface, but may be so-called cylindrical lenses having a curvature in a specified direction. The light source unit 501 may have another lens as an optical-path changing section, in addition to the convergent lens 511 and the divergent lens 512.

Third Embodiment

Figure 6:
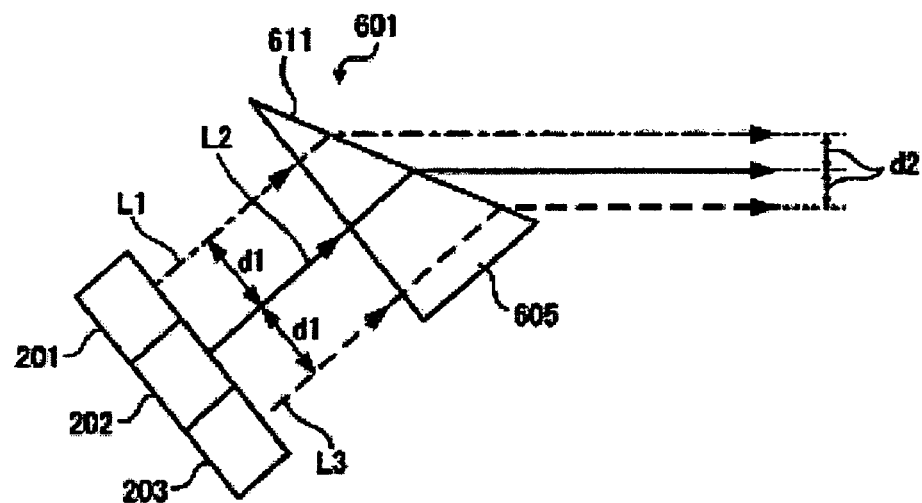
FIG. 6 is a schematic diagram of a light source unit according to a third embodiment of the invention.

FIG. 6 is a schematic diagram of a light source unit 601 according to a third embodiment of the invention. The same components as those of the light source unit 101 according to the first embodiment are given the same reference numerals and their duplicate description will be omitted. The light source unit 601 includes a prism element 605 that transmits color lights. The prism element 605 serves as an optical-path changing section for changing the optical paths of the color lights. The prism element 605 can be made of a glass material or a transparent resin material, as is the prism element 205 according to the first embodiment. The prism element 605 can be formed by cutting or injection molding.

The prism element 605 has a triangular shape. Substantially parallel color lights are incident on the prism element 605. The color lights incident on the prism element 605 are refracted by a light-exiting plane 611. The light-exiting plane 611 serves as a refracting interface that refracts the color lights so as to decrease the distance among the color lights. The color lights remain substantially parallel because of refraction by the light-exiting plane 611. Thus the prism element 605 outputs the color lights from the light sources 201, 202, and 203 such that they are substantially parallel with one another and the distance between them are smaller than that when they enter from the light sources 201, 202, and 203. Accordingly, the color lights can be applied in proximity. The prism element 605 may not be limited to the structure in which the light-exiting plane 611 serves as a refracting interface but may be a structure in which the light-incidence plane serves as a refracting interface, or alternatively, the light-incidence plane and the light-exiting plane 611 may serve as refracting interfaces. The prism element 605 may have steps on the refracting interface, like the prism element 205 according to the first embodiment.

Fourth Embodiment

Figure 7:
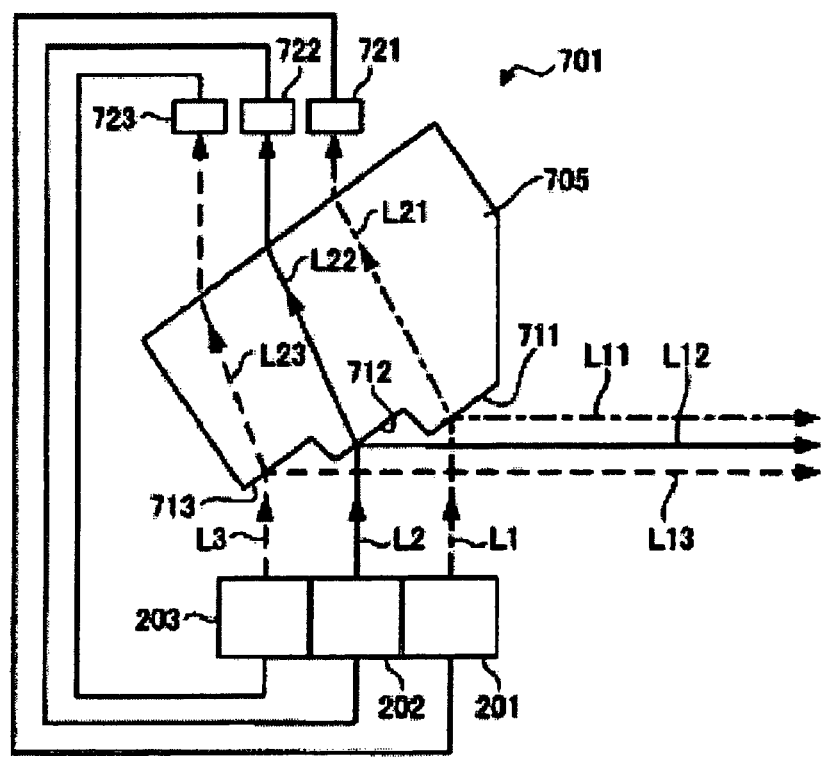
FIG. 7 is a schematic diagram of a light source unit according to a fourth embodiment of the invention.

FIG. 7 is a schematic diagram of a light source unit 701 according to a fourth embodiment of the invention. The same components as those of the light source unit 101 according to the first embodiment are given the same reference numerals and their duplicate description will be omitted. The light source unit 701 reflects part of the color lights from the light sources 201, 202, and 203 toward a region to be irradiated, and transmits part of the other of the color lights into detecting sections 721, 722, and 723.

A prism element 705 serves as an optical-path changing section for changing the optical paths of the color lights. The prism element 705 can be made of a glass material or a transparent resin material, as is the prism element 205 according to the first embodiment. The prism element 705 has step-like slopes 711, 712, and 713 on the color-light incidence plane. The prism element 705 can be formed by cutting or injection molding.

The slopes 711, 712, and 713 are inclined at substantially the same angle. The slopes 711, 712, and 713 have steps corresponding to the light sources 201, 202, and 203. The slopes 711, 712, and 713 serve as reflecting plane for reflecting the lights from the corresponding light sources 201, 202, and 203, as with the slopes 211, 212, and 213 of the light source unit 101. The slopes 711, 712, and 713 have a semi-reflecting film that reflects part of the incident lights and transmits part of the other of the incident lights. The semi-reflecting film disposed on the slopes 711, 712, and 713 reflects, for example, about 85% of the incident lights and transmits about 10% of the incident lights.

Partial light L11 of the R-light L1 incident on the slope 711 is reflected by the slope 711. The other partial light L21 of the R-light L1 incident on the slope 711 passes through the slope 711. Partial light L12 of the G-light L2 incident on the slope 712 is reflected by the slope 712. The other partial light L22 of the G-light L2 incident on the slope 712 passes through the slope 712. Partial light L13 of the B-light L3 incident on the slope 713 is reflected by the slope 713. The other partial light L23 of the B-light L3 incident on the slope 713 passes through the slope 713. The lights L11, L12, and L13 reflected by the slopes 711, 712, and 713, respectively, travel such that they are substantially parallel and the distance between them are smaller than that when they enter from the light sources 201, 202, and 203, as in the first embodiment.

The lights L21, L22, and L23 that have passed through the slopes 711, 712, and 713 pass through the prism element 705 into the detecting sections 721, 722, and 723, respectively. The detecting sections 721, 722, and 723 detect the color lights that have passed through the slopes 711, 712, and 713, respectively. The detecting sections 721, 722, and 723 can be constructed of, for example, photodiodes. The detecting section 721 outputs the amount of the R-light L21 detected by the detecting section 721 as a detection result. The light source 201 controls the amount of the R-light L1 to be supplied in response to the detection result of the detecting section 721.

Also the detecting sections 722 and 723 output the detected amounts of the G-light L22 and the B-light L23 as detection results, as with the detecting section 721. The light source 202 controls the amount of the G-light L3 to be supplied in response to the detection result of the detecting section 722. The light source 203 controls the amount of the B-light L3 to be supplied in response to the detection result of the detecting section 723. The light source unit 701 can feedback-control the light sources 201, 202, and 203 by using the lights that have passed through the slopes 711, 712, and 713. This allows a plurality of beam lights to be brought close to one another at a preferable balance of light amount. The prism element 705 may have a slope on the surface opposite to the light-incidence plane, as with the prism element 205 according to the first embodiment.

Fifth Embodiment

FIG. 8 is a schematic diagram of an image display unit 800 according to a fifth embodiment of the invention. The same components as those of the first embodiment are given the same reference numerals and their duplicate description will be omitted. The image display unit 800 is a so-called a front projector for display images in such a way that laser light that is applied onto a screen 805 provided on the viewer side and the light reflected by the screen 805 is displayed. The image display unit 800 includes the light source unit 101 as in the first embodiment.

The viewer-side surface of the image display unit 800 has a light-exiting window 810 made of a transparent member, such as glass or transparent resin. The laser light from the galvano mirror 104 passes through the light-exiting window 810 and is incident on the screen 805. Since the image display unit 800 according to this embodiment uses the light source unit 101 as in the first embodiment, color lights can be applied in proximity to one another onto the screen 805, thus allowing high-quality images to be displayed.

Although the light source unit of the foregoing embodiments uses the light sources 201, 202, and 203 that apply laser light, the invention is not limited to that this and another structure may be used as long as it can apply light beams. For example, the light sources of the light source unit may be solid-state light-emitting elements such as LEDs.

The light source unit according to embodiments of the invention is useful in application to an image display unit that displays images, and particularly, it is suitable for displaying high-quality images by applying light beams.

What is claimed is:

1. A light source unit, comprising:
    a plurality of light sources that provide light beams; and
    an optical-path changing section that outputs the light beams emitted from the light sources, such that the light beams are substantially parallel to one another and a distance between the outputted light beams is smaller than a distance between the light beams inputted from the light sources so that an optical path of the light beams is changed,
    the plurality of light sources providing the substantially parallel light beams to the optical-path changing section, and
    the optical-path changing section including a convergent lens that converges the converging light beams from the plurality of light sources and a divergent lens that diverges the light beams from the convergent lens.

2. A light source unit, comprising:
    a plurality of light sources that provide light beams; and
    an optical-path changing section that outputs the light beams emitted from the light sources, such that the light beams are substantially parallel to one another and a distance between the outputted light beams is smaller than a distance between the light beams inputted from the light sources so that an optical path of the light beams is changed,
    the plurality of light sources providing the substantially parallel light beams to the optical-path changing section, and
    the optical-path changing section being a prism element that transmits the light beams, the prism element having a refractive plane that refracts the light beams so as to decrease the distance between the outputted light beams.

3. The light source unit according to claim 2, further comprising
    a detecting section that detects the light beams; and
    reflecting plane that reflects a portion of the light beams incident from the light sources and that transmits another portion of the light beams incident from the light sources.

4. The light source unit according to claim 2, further comprising:
    the detecting section detecting the other portion of the light beams that is transmitted by the reflecting plane; and
    the light sources being controlled according to a detection result of the detecting section to control an amount of the light beams output by the light sources.

5. An image display unit, comprising:
    a light source unit that provides light beams responsive to an image signal, the light source unit comprising:
    a plurality of light sources that provide light beams;
    an optical-path changing section that outputs the light beams emitted from the light sources, such that the light beams are substantially parallel to one another and a distance between the outputted light beams is smaller than a distance between the light beams inputted from the light sources so that an optical path of the light beams is changed; and
    a scanning section that applies the light beams from the light source unit.

* * * * *